April 11, 1967 J. C. HELMER ETAL 3,313,936
LOW ENERGY ELECTRON DIFFRACTION APPARATUS HAVING
THREE CONCENTRIC TUBULAR FOCUSING ELECTRODES
Filed Jan. 6, 1964 2 Sheets-Sheet 1
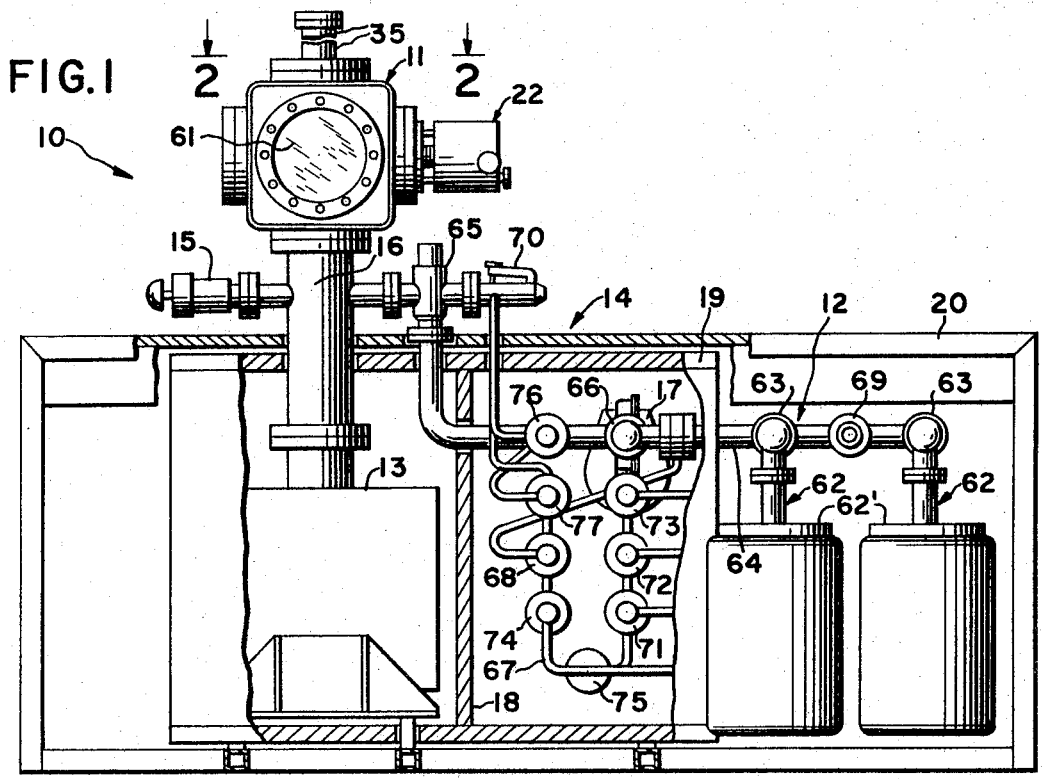
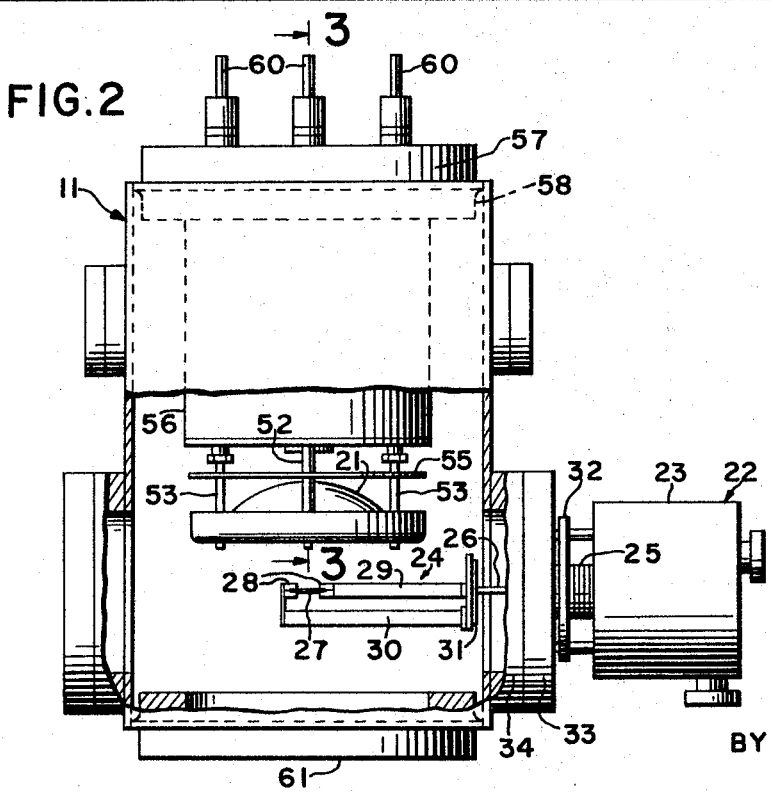
INVENTORS
JOHN C. HELMER
NORMAN J. TAYLOR
BY
ATTORNEY

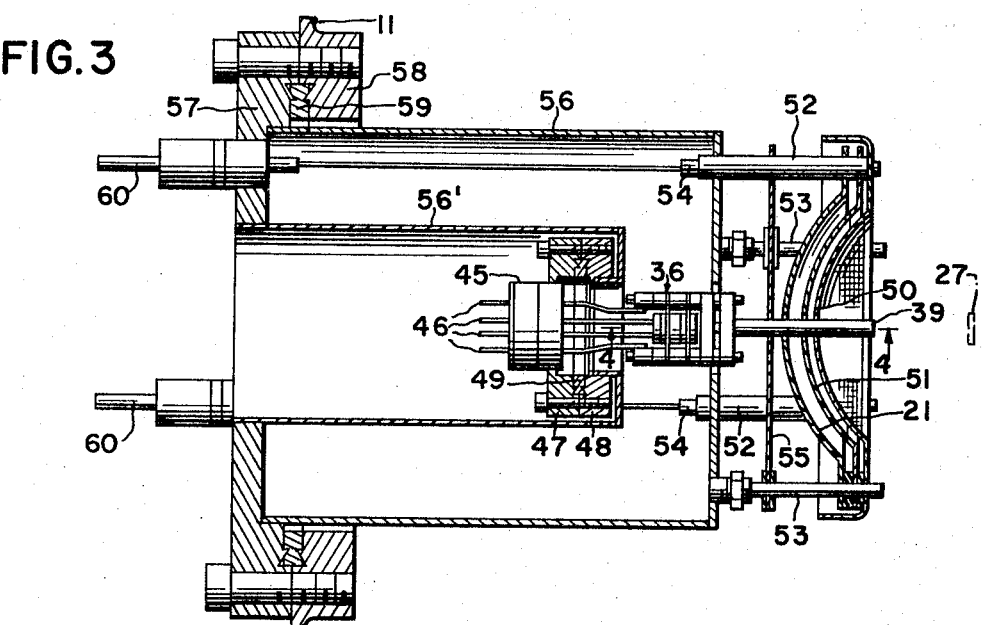
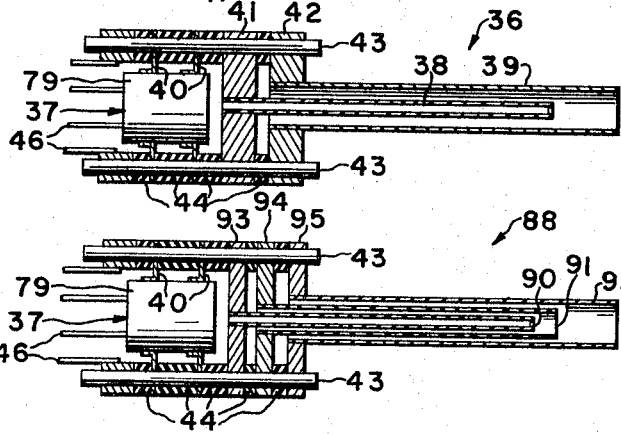
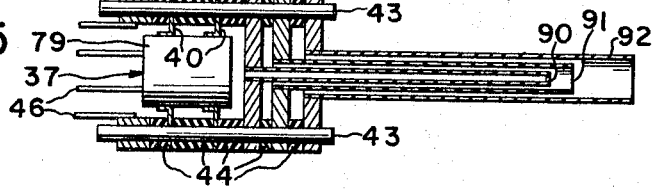
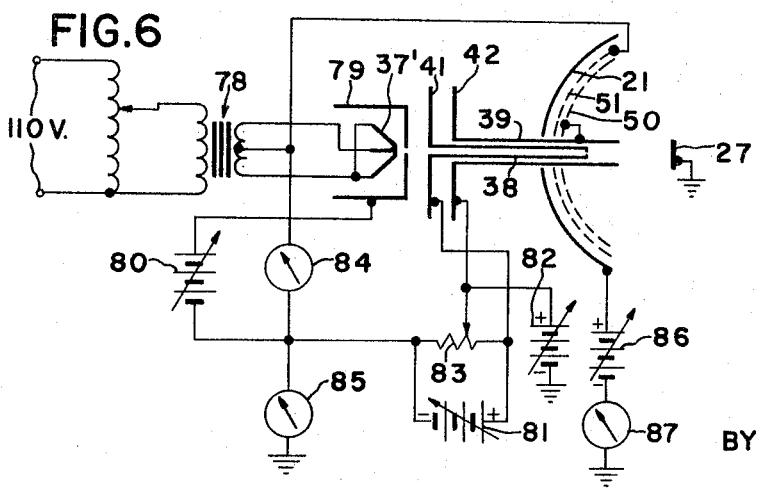

United States Patent Office 3,313,936
Patented Apr. 11, 1967

3,313,936
LOW ENERGY ELECTRON DIFFRACTION APPARATUS HAVING THREE CONCENTRIC TUBULAR FOCUSING ELECTRODES
John C. Helmer, Menlo Park, and Norman J. Taylor, Sunnyvale, Calif., assignors to Varian Associates, Palo Alto, Calif., a corporation of California
Filed Jan. 6, 1964, Ser. No. 335,793
6 Claims. (Cl. 250—49.5)

This invention relates to a low energy electron diffraction apparatus useful in studying surface phenomena of solids such as the spatial arrangement of individual atoms at the surface of a crystal, the chemical effects on such a surface caused by, for example, adsorption of gases, oxidation, and corrosion, the formation of epitaxial layers thereon, and catalytic processes.

Apparatus for studying surface phenomena have been known having for their principle of operation the irradiating of the surface of a clean crystalline sample in a high vacuum environment with a highly collimated stream of low energy electrons, and observing the pattern produced by electrons which undergo elastic collisions (the only electrons which contribute to the diffraction pattern) with the surface atoms of the crystalline sample, for example, by continuous display of the diffraction pattern on a fluorescent screen. Since the slow electrons do not penetrate much beyond the first atomic layer, the diffraction takes place in the main from the ordered rows of atoms comprising the surface of the crystalline sample. Thus, the surface of the crystalline sample may be studied until its geometry is understood; then, pure gases or gas mixtures may be admitted and changes in the surface structure may be observed as they occur. By this means oxidation and corrosion effects, epitaxial growth and catalytic processes can dynamically be studied.

The atoms on a surface form rows with uniform spacing on the order of angstrom units. These rows are analogous to the lines of a diffraction grating. In a low energy diffraction apparatus, electrons are usually directed toward the crystal in a general direction which is normal to the crystal, by a series of lenses in such a manner that the diffracted electrons are focused onto a luminescent screen. The angle these diffracted electrons make with the normal to the crystal depends on the speed of the electrons and, of course, upon the geometric arrangement of the surface atoms. The effectiveness of this apparatus as a research tool, therefore, is in great measure dependent on the ability to converge the electrons on a spot on the crystal's surface representing only a fraction of a monolayer of surface coverage.

For apparatus employing focusing of electron beams, $$d_s = d_f x \frac{l_s}{l_f} \sqrt{\frac{V_f}{V_s}}$$

where
$d_f$=diameter of beam at source
$l_f$=distance from source to lens
$d_s$=diameter of spot formed by beam on screen
$l_s$=distance from lens to sample to screen
$l_s/l_f$=magnification factor
$l_f$ and $l_s$=total beam path length
$V_f$=accelerating voltage at source
$V_s$=final beam voltage.

In prior art low energy electron diffraction apparatus, of necessity the lens structure has been positioned a considerable distance from the sample with respect to its distance from the source. This contributes to a large magnification of the beam at the screen, on the order of 8 in prior art apparatus, which is a disadvantage since a small beam is desirable. In addition, the long distance between the filament and screen allows the beam to spread and become distorted due to space charge and stray magnetic field effects.

In accordance with one teaching of the present invention, there is disclosed a low energy electron diffraction apparatus for studying the surface phenomena of a solid such as a crystalline sample which includes, an evacuable diffraction chamber, a means for holding the sample within the chamber, a cathode means for providing a source of electrons, a means for collimating the electrons into a stream directed toward the sample, a means closely spaced to the sample for converging the stream of electrons, and a luminescent screen for displaying a pattern created by electrons diffracted from the surface of the sample. In a preferred embodiment the screen is spherical, the sample is held at the center of curvature of the screen, the cathode is positioned behind the screen and there is provided a plurality of coaxial tubular electrodes at least one of which serves to collimate the electrons into a stream which passes through a central aperture in the screen and is directed at the sample, the downstream end portions of the tubular electrodes, preferably staggered, serving to converge the stream. Placing the cathode means behind the screen and the converging means between screen and sample has the advantage of increasing $l_f$, reducing $l_s$ and minimizing total beam path length. In this manner space charge and magnetic field effects are minimized, while at the same time the magnification factor may be reduced to the order of unity.

The principal object of the present invention, therefore, is to provide an improved high resolution low energy electron diffraction apparatus.

One feature of the present invention is the provision in an apparatus of the above type and which includes a luminescent screen for continuously displaying a diffraction pattern, of cathode means for providing a source of electrons, a means for collimating the electrons into a stream and a means closely spaced to the sample under study for converging the stream of electrons, whereby a small high intensity pattern or image is produced on the screen.

Another feature of the present invention is the provision of a low energy electron gun for use, for example, in apparatus of the above type including a plurality of coaxial tubular electrodes at least one of which collimates the electrons into a stream, the downstream end portions of these electrodes, preferably staggered, serving to converge the stream.

These and other objects and features of the present invention and a further understanding may be had by referring to the following description and claims, taken in conjunction with the following drawings in which:

FIG. 1 is a front view partially broken away showing a low energy electron diffraction apparatus incorporating the novel features of the present invention;

FIG. 2 is an enlarged view partially broken away taken along the lines 2—2 of FIG. 1 in the direction of the arrows;

FIG. 3 is an enlarged cross-sectional view taken along lines 3—3 of FIG. 2 rotated 90°;

FIG. 4 is an enlarged cross-sectional view taken along lines 4—4 of FIG. 3;

FIG. 5 is an enlarged cross-sectional view of another embodiment of the novel electron gun of the present invention; and FIG. 6 is a diagrammatic view depicting the novel electron optics of the present invention.

Referring now to FIG. 1 there is shown generally a low energy electron diffraction apparatus 10 incorporating novel features of the present invention. The apparatus includes: a diffraction chamber 11 where the surface phenomena studies, for example, on a crystalline sample are conducted; a roughing system 12 for producing a completely contaminant free roughing vacuum (below $10^{-2}$ torr) within the apparatus; a pump means 13 for evacuating the chamber 11 to pressures below $10^{-10}$ torr; a gas inlet manifold system 14 for admitting small quantities of ultra-pure gas or gas mixtures to the chamber 11 for crystal cleaning and adsorption studies; a throttling valve 15 placed in the exhaust conduit 16 of the chamber 11 to prevent the test gases admitted to chamber 11 from the manifold system 14 from immediately being pumped out by the pump means 13; pump means 17 for evacuating the manifold system 14 so as to permit clean-up before admitting another test gas; conventional bake-out ovens 18, 19 for separately baking out the pump means 13, manifold system 14 and chamber 11 (the bake-out oven for the chamber 11 is not shown); and, a cabinet 20 for housing substantially all of the apparatus 10 except the diffraction chamber 11.

Referring to FIGS. 1–3 the diffraction chamber 11 is of rectangular shape and constructed from non-magnetic stainless steel by heliarc welding. The chamber is provided with large circular ports in its front and rear walls, and with smaller ports in its side walls. These ports are adapted to receive in vacuum tight manner different instrumentation and equipment to be used within the chamber 11. In a typical embodiment the chamber is 9″ high, 9″ wide, and 13⅜″ long.

Installed within the chamber 11 is a spherically shaped fluorescent screen 21 for continuously displaying a diffraction pattern. In a typical embodiment the screen has a frontal diameter of 3½″ and a radius of curvature of 2¾″. A phosphor coating gives a white diffraction pattern.

A crystal manipulator unit 22 is connected in vacuum tight manner through a port in one of the side walls of the chamber 11, supports the sample at the center of curvature of the screen 21 and provides the mechanical and electrical feedthroughs for the crystal sample. The mechanical motion is introduced through the wall of the chamber from a universal motion feedthrough 23 to a crystal holder 24 by means of a welded all metal bellows seal 25 and a flexible rotary actuating rod 26. The crystalline sample 27 is removably held between a pair of clamps 28 which in turn are supported by a pair of crystal leads 29, 30 as of molybdenum ribbon electrically isolated from each other by an insulator 31. Means 32 are provided to tilt the feedthrough 23 on a flange 33 mounted in vacuum tight manner to a flange 34 integral with the chamber 11 to thereby tilt the crystal holder 24. The unit 22 allows the sample 27 to be rotated 360°, raised and lowered 1½″, tilted 15° from the vertical and shifted laterally ⁵⁄₁₆ of an inch. A high current, low voltage power supply is connected by means of feedthroughs (not shown) to the leads 29, 30 to provide for direct resistance heating of the sample 27.

A standard problem in the study of surface phenomena is the preparation of a clean surface. This may be accomplished by direct resistance heating of the sample 27 through energization of the leads 29, 30. However, there may be residual layers of gas molecules that cannot be removed by heating alone. One technique which may be employed is that of gas reaction whereby the sample 27 is heated in an atmosphere of some gas which is highly reactive with these residual gas layers. For example, in the case of a nickel surface there may be residual layers of carbon and oxygen which cannot be removed by heating alone. The carbon is removed by heating in oxygen producing carbon monoxide which easily comes off the surface. Next, the oxygen on the surface is reduced by heating in hydrogen. The adsorbed hydrogen is then removed by heating, resulting in a clean nickel surface.

For some crystals, cleaning is best accomplished by bombardment with noble gas ions. A conventional ion gun 35 is connected in vacuum tight manner to the chamber 11 which permits bombardment of the surface of the sample 27 with noble gas ions, for example, argon. Ion voltages are adjustable up to 175 volts. It has been observed that bombarding a surface with low energy ions produces an etching effect. Thus, the sample 27 may be cleaned by direct resistance heating, gas reaction, sputtering or their combination.

The clean surface is then irradiated by a stream of highly collimated low energy electrons which pass through an opening in the center of screen 21. Referring to FIGS. 2–4, the electrons are produced and directed to an electron gun 36 which includes a cathode 37 having a filament therein (not shown), a first anode electrode 38 and a second anode electrode 39. The cathode 37 and anodes 38, 39 are held in axial alignment by grip rings 40, and annular metal (304 stainless steel, for example) rings 41, 42, respectively, which are supported on ceramic insulator rods 43. The electrodes are longitudinally spaced and electrically isolated by means of insulators 44.

The gun 36 is terminated by a base 45 having a plurality of leads 46 which pass through the base 45 for providing electrical connection to the electrodes of gun 36. The base 45 is sealed to a flange member 47 which is removably joined in vacuum tight manner to a mating flange 48 welded to a recessed portion 56′ of metal portion 56 upon compression of a soft metal copper gasket 49. This unique arrangement allows easy replacement of the entire gun assembly.

The cathode 37 is preferably one in which the electrostatic and electromagnetic fields due to currents therein or potential differences thereacross are substantially zero. For example, the electron emitting means or filament may be made of thoriated tantalum sheet metal fashioned in the shape of a cross having its legs bent slightly backward. Parallel leads may be connected to each of the four legs and supported by a circular ceramic insulator located behind and parallel to the plane of the flat portion of the filament. The filament and insulator may be surrounded by a non-magnetic stainless steel can approximately 1½″ in diameter and 1½″ long and having an axially positioned aperture 0.030″ in diameter through which the electrons pass. The flat portion of the filament is parallel to and spaced approximately 0.010″ from the aperture in the can. The filament may be heated by alternating current connected to leads on opposite points of the cross. The filament material is such that it may be let up to atmosphere at room temperature without impairing its emission characteristics. An equivalent cathode structure may also be used.

The first anode 38 comprises a tube which extends through the opening in the screen 21. In a typical embodiment the tube is made of platinum or 304 stainless steel, has a ⅛″ outside diameter, 0.010″ wall thickness, is 2.350″ long, spaced 0.040″ from the cathode 37 and has a 0.040″ aperture at the upstream end and a ¹⁄₁₆″ opening at the downstream end.

Tube 38 is surrounded by the second anode, a coaxial tube 39 whose downstream end preferably extends beyond the downstream end of tube 38. In a typical embodiment tube 39 is made of 304 stainless steel, has a ¼″ outside diameter, 0.015″ wall thickness, is 2.50″ long with its upstream end being spaced 0.035″ from the upstream end of tube 37.

When the anodes 38, 39 are energized at potentials positive with respect to the cathode 37 and anode 38 positive with respect to anode 39, for example, the electrons produced by the cathode 37 are collimated and accelerated by means of the first anode 38 towards the sample 37. The electrostatic field between the staggered ends of the tubes 38, 39 converges the electrons towards the sample 27. Thus, the staggered downstream ends of the tubes 38, 39 act as an electron lens. Positioning the cathode means 37 behind screen 21 and positioning the lens formed by the downstream ends of the tubes 38, 39 between the screen 21 and close to sample 27 results in a reduced magnification factor permitting larger source and smaller spot size. The total beam length may also be shorter resulting in less sensitivity to stray magnetic fields. The shorter distance between the lens and sample 27 reduces space charge spreading of the beam at the low voltages.

The electrons which impinge upon the sample 27 are back diffracted and pass through a pair of spaced apart spherical fine mesh grids 50, 51, for example, 100 mesh, gold plated tungsten with 80% transparency, before being accelerated into the screen 21. The grids each have a central aperture through which the gun 36 passes. The first grid 50 is operated at approximately sample potential so as to provide a region about the sample 27 which is free of electric fields that might otherwise affect electron trajectory. The second grid 51 which is disposed between grid 50 and screen 21 is operated at approximately cathode potential so as to suppress electrons having less than incident beam energy. Most electrons are reflected diffusely from the sample with considerably less energy. These contain no diffraction information and if not suppressed may obliterate the pattern contained in the small number of elastically reflected electrons.

Each of the grids 50, 51 and the screen 21 have an apertured annular flanged portion which acts to support the grids on alternate hollow ceramic insulator tubes 52 and solid ceramic rods 53. Hollow tubes 52 carry metal rods 54 which provide electrical connection to the grids 50, 51 and the screen 21, respectively. A support plate 55 held on the rods 53 supports anode tube 39 of gun 36. Tubes 52 and rods 53 are removably carried from the end of a cylindrical metal portion 56 having a metal flange member 57 welded about the opposite end of the portion 56. The flange member 57 is removably joined in vacuum tight manner to a mating flange 58 integral with chamber 11, upon compression of a soft metal copper gasket 59. The feed-throughs 60 provide electrical connection to the grids 50, 51 and screen 21. This unique arrangement allows easy replacement of the entire gun and screen assembly.

A large viewing port 61, for example, 5½″ diameter 7052 glass, mounted in vacuum tight manner to the front of chamber 11 allows the research worker to observe and photograph events taking place in the chamber 11.

The roughing system 12 produces a completely contaminant free roughing vacuum and includes a plurality of sorption pumps 62 which may be chilled by liquid nitrogen (not shown) held in Dewars 62' which are connected by a plurality of valves 63 to a roughing manifold 64. Manifold 64 connects the roughing system 12 to the diffraction chamber 11 and pump means 13 through a T valve 65, to the pump means 17 through a valve 66, and to the manifold 67 of the gas inlet manifold system 14 through a valve 68. Valve 69 allows the roughing system 12 to be independently let up to air.

The pump means 13 for maintaining ultra-high vacuum within the diffraction chamber 11 may comprise, for example, a 140 l./s. magnetically confined glow discharge pump. Such a pump is preferably since it introduces no contaminants into the apparatus and is capable of producing very low pressures for long periods of time without requiring attention. A basic requirement for the study of surface phenomena is an atomically clean surface. Even at vacuums as low as $10^{-6}$ torr, a clean surface may be contaminated by a monolayer of gas atoms in about 1 second. Utilizing a magnetically confined glow discharge pump allows the chamber 11 to be evacuated to pressures in the order of $10^{-10}$ torr so that the surface remains clean long enough for experimental measurements to be made.

Pure gases or gas mixtures may be admitted to the diffraction chamber 11 from the gas inlet manifold system 14 through an all metal bakeable leak valve 70. Gas bottles (not shown) are connected to the system 14 through Viton-A sealed gas inlet valves 71, 72, 73, 74 to allow convenient selection of gases or gas mixtures to be admitted to the chamber 11. A bakeable thermocouple gauge 75 aids in obtaining proper gas mixture ratios. Valve 76 allows the system 14 to be evacuated by pump means 17. Another valve 77 allows the system 14 to be independently let up to air. The throttling valve 15 placed in the exhaust conduit 16 of the chamber 11 may be actuated so as to prevent the test gases from the system 14 from immediately being pumped out by the pump means 13. Another pump means 17, for example, an eight l./s. magnetically confined glow discharge pump permits cleanup of the manifold system 14 before admitting another gas.

A typical operating cycle will now be explained and with reference to the diagrammatic view of FIG. 6. After the sample 27 has been positioned, the chamber 11 baked out and evacuated, and the sample 27 cleaned in the manner described above, the filament 37' of the cathode 37 may be heated by an alternating current source 78 of about 4 amperes at approximately 1 volt. The filament can 79 may be maintained at a potential positive or negative with respect to the filament 37', for example −27 to +27 volts to thereby vary emission current by means of a variable D.C. power supply 80. The beam produced by the cathode 37 is accelerated and collimated by means of the first anode tube 38 which is maintained at some positive potential, for example, 0–500 volts by means of a variable D.C. power supply 81. The second anode tube 39 is connected directly to grid 50 and is ordinarily run at ground potential so as to provide a field free region about the sample 27 which is also at ground potential. For samples requiring very low beam voltages, for example, less than 15 volts, the anode tube 39 is biased positively, for example, 0–250 volts by means of a variable D.C. power supply 82.

The electrostatic field between the ends of the tubes 38, 39 converges the electrons toward the sample 27 and may focus them to a spot on the screen 21 which can be as small as 0.020″ diameter. Convergence is determined primarily by the ratios of the diameters of the tubes 38, 39 and the potential difference thereacross. A tap of variable resistor 83, which is in parallel with power supply 81, is connected by means of a lead to the tube 39 to allow adjustment of the potential difference between the tubes 38, 39 to thereby allow adjustment in focusing of the beam.

Grid 51 is connected to the negative side of power supply 81 whereby grid 51 rides at cathode potential and suppresses electrons scattered from the sample 27 with less than incident beam energy. Meter movement 84 allows determination of beam current while meter movement 85 allows determination of beam voltage.

The diffracted electrons which pass through the grids 50, 51 are accelerated to the screen 21 which is maintained at some positive potential, for example, 2–7 kilovolts by means of a variable power supply 86 which voltage is determinable by means of meter movement 87. At normal incidence the diffracted electrons are located symmetrically about the incident beam and thus produce a pattern or image on screen 21 which in simple cases closely resembles the arrangement of atoms on the surface of the sample 27.

Referring to FIG. 5 there is shown another embodiment of the novel electron gun of the present invention. The electron gun 88 includes a cathode 37 having a filament therein (not shown), a first tubular anode electrode 90, a second tubular anode electrode 91 which surrounds and is coaxial with the first anode electrode 90 and having a downstream end preferably extending beyond the downstream end of tube 90 and a third tubular anode 92 which surrounds and is coaxial with the tube 91 and having a downstream end preferably extending beyond the downstream end of tube 91. These electrodes are longitudinally spaced and electrically isolated by means of insulators 44 and held in axial alignment by means of annular metal rings 93, 94, 95, respectively. In a typical embodiment the tube 90 is made of 304 stainless steel, has a 1/8" outside diameter, 0.012" wall thickness, is 2.075" long, spaced 0.040" from cathode 37 and has a 0.040" aperture at the upstream end and a 1/16" opening at the downstream end. Tube 91 is made of 304 stainless steel, has a 3/16" outside diameter, 0.005" wall thickness, is 2.075" long, with its upstream end being spaced 0.20" from the upstream end of tube 90. Tube 92 is made of 304 stainless steel, has a 1/4" outside diameter, 0.006" wall thickness, is 2.375" long, with its upstream end being spaced 0.20" from the upstream end of tube 91.

The embodiment disclosed in FIG. 5 is more versatile than the embodiment shown in FIG. 4 in that it enables the gun to operate over a wider voltage range. In particular, it extends the high voltage range of the gun. For example, if the tube 90 were operated at 500 volts, tube 91 at ground and tube 92 electrically connected to tube 90 the resultant beam voltage would approximate the voltage of the available power supply of 500 volts. The embodiment disclosed in FIG. 5 can also be operated in a manner similar to the embodiment disclosed in FIG. 4 by electrically connecting tubes 91 and 92 together.

Since many changes can be made in the above construction and many apparently widely different embodiments of this invention could be made without departing from the scope thereof, it is intended that all matter contained in the above description and shown in the accompanying drawing shall be interpreted as illustrative and not in a limiting sense.

What is claimed is:

1. In a low energy electron diffraction apparatus for studying the surface phenomena of a solid having a high vacuum evacuable chamber with means for supporting a sample under investigation and a spherically shaped screen and grid means for displaying back diffracted electron beam patterns and having a centrally located aperture, an electron gun assembly comprising: means disposed on the convex side of said screen for providing a stream of electrons; a first tubular electrode which passes through the aperture in said screen having its upstream end spaced from said cathode and its downstream end positioned on the concave side of said screen for collimating said stream of electrons; means for applying a potential to said first electrode to accelerate said electrons; a second tubular electrode concentric with and surrounding said first electrode having its downstream end closer to said sample than said first electrode for focusing said stream of electrodes; means connected to said second electrode for applying a low potential to said second electrode relative to the potential applied to said first electrode; a third tubular electrode concentric with and surrounding said second electrode having its downstream end closer to said sample than said second electrode for controlling the incident electron beam voltage of said stream of electrons; and means connected to said third electrode for applying a voltage potential to said third electrode.

2. The apparatus of claim 1 including means for connecting said third electrode to said first electrode.

3. A diffraction chamber and low energy gun assembly adapted for convenient mounting and demounting of said gun from said chamber including: an evacuable metal chamber having at least one flanged port adapted to receive said gun in a vacuum tight manner; an electron gun comprising a cathode surrounded by a metal can having an axially disposed aperture through which electrons flow for providing a stream of electrons, a plurality of concentric, surrounding staggered tubular electrodes, a plurality of annular rings one of which is rigidly fixed to one end of each of said electrodes, a plurality of grip rings rigidly fixed to said can, a plurality of insulator rods for engaging said annular rings and said grip rings for holding said can and said electrodes in axial alignment, a plurality of insulators also engaged by said rods and disposed between said annular and grip rings for longitudinally spacing said electrodes and can, said annular rings and rods providing the sole mechanical interconnection and support for said tubular electrodes; and means for removably attaching said gun to said port in a vacuum-tight manner.

4. An electron diffraction apparatus comprising an evacuable metal chamber having a port surrounded by a first sealing flange, a centrally apertured screen and grid assembly, an electron gun assembly including a tubular electrode projecting through the aperture in said screen and grid assembly, a main mounting structure for said gun assembly and said screen and grid assembly; said main mounting structure having a second sealing flange removably connected to said first flange in a vacuum-tight manner, said screen and grid assembly being connected to the inner end of said main mounting structure, said main mounting structure having a central port surrounded by a third sealing flange positioned outwardly of said screen and grid assembly, a fourth sealing flange carried by said gun assembly and removably connected to said third flange in a vacuum-tight manner, whereby said gun assembly can be removed by disconnecting said third and fourth flanges without disturbing said screen and grid assembly, and said gun assembly and said screen and grid assemblies can be removed as a unit by disconnecting said first and second flanges.

5. An electron diffraction apparatus as claimed in claim 4 wherein said main mounting member comprises a first cylinder connected to said second flange and projecting into said chamber, an end plate on the inner end of said first cylinder and centrally apertured to receive a portion of said gun, said screen and grid assembly being connected to said end plate on the "inner side" of the end plate, said main mounting member further comprising a second cylinder spaced inside said first cylinder, said second cylinder being connected to said second flange and projecting into said first cylinder, said third flange being mounted on the inner end of said second cylinder, and the outer end of said cylinder being open to provide access to said third and fourth flanges.

6. An electron diffraction apparatus as claimed in claim 5 further comprising a centrally apertured support plate mounted on said end plate between the end plate and said screen, and said tubular electrode being centered and supported by a sliding fit in said aperture in said support plate.

References Cited by the Examiner

UNITED STATES PATENTS

| | | | |
|---|---|---|---|
| 2,223,040 | 11/1940 | Mahl | 313—82 |
| 2,249,453 | 7/1941 | Boersch et al. | 250—49.5 |
| 2,348,030 | 5/1944 | Snyder | 250—49.5 |
| 2,753,458 | 7/1956 | Kazato et al. | 250—49.5 |
| 3,218,431 | 11/1965 | Stauffer | 250—49.5 |

OTHER REFERENCES

31 Review of Scientific Instruments, No. 2, Scheibner et al., American Institute of Physics, Lancaster, Pennsylvania, February 1960, pp. 112–114.

31 Review of Scientific Instruments, No. 7, Germer et al., July 1960, p. 784.

33 Review of Scientific Instruments, No. 7, Lander et al., July 1962, pp. 782–783.

139 Science, No. 3553, MacRae, American Association for the Advancement of Science, Washington, D.C., February 1963, pp. 379–388.

RALPH G. NILSON, *Primary Examiner.*

ARCHIE R. BORCHELT, WALTER STOLWEIN, *Examiners.*

A. L. BIRCH, *Assistant Examiner.*